UNITED STATES PATENT OFFICE.

GEORG MERLING AND HUGO KÖHLER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

METHYLENE-ETHYL-METHYL KETONE.

981,669.      Specification of Letters Patent.     Patented Jan. 17, 1911.

No Drawing.    Application filed December 21, 1909.   Serial No. 534,349.   (Specimens.)

*To all whom it may concern:*

Be it known that we, GEORG MERLING, professor of chemistry, doctor of philosophy, and HUGO KÖHLER, doctor of philosophy, chemist, citizens of the German Empire, residing at Elberfeld, Germany, have invented new and useful Improvements in Methylene-Ethyl-Metheyl Ketone, of which the following is a specification.

This application relates to the manufacture and production of the hitherto unknown methylene-ethyl-methyl ketone. It is obtained by treating methylketobutanol

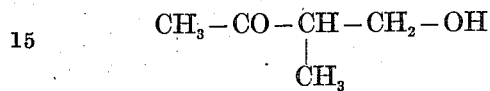

with dehydrating agents, such as $ZnCl_2$, sulfuric acid, $KHSO_4$, $NaHSO_4$, etc.

In order to illustrate the new process more fully the following example is given, the parts being by weight: 100 parts of freshly distilled methlyketobutanol are heated with 50 parts of sodium bisulfate in an oil bath to 120–130° C. Water and methylene-ethyl-methyl ketone distil over forming two layers. The aqueous layer is removed and the new ketone

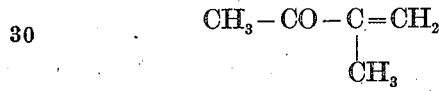

is dried with potassium carbonate and distilled. It is a limpid strongly refractive oil having a pungent odor and boiling at 98° C. It is soluble with difficulty in water, easily soluble in alcohol, ether and benzene and is probably formed according to the following formula:

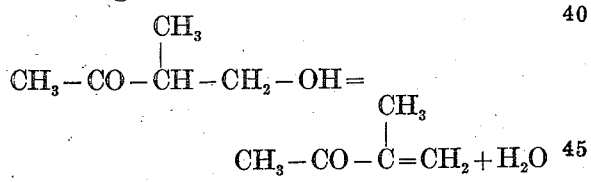

The new body is a valuable intermediate compound for producing pharmaceutical products or other valuable compounds.

We claim:

The herein described methylene-ethyl-methyl ketone obtainable by reacting upon methylketobutanol with dehydrating agents, which product is a limpid strongly refractive oil having a pungent odor and boiling at 98° C. soluble with difficulty in water and readily soluble in alcohol, ether and benzene, substantially as described.

In testimony whereof we have hereunto set our hands in the presence of two subscribing witnesses.

GEORG MERLING. [L. S.]
          HUGO KÖHLER. [L. S.]

Witnesses:
   OTTO KÖNIG,
   CHAS. J. WRIGHT.